United States Patent
Soeda et al.

(10) Patent No.: US 6,228,928 B1
(45) Date of Patent: *May 8, 2001

(54) CARBON BLACK AND RUBBER COMPOSITION CONTAINING SAME

(75) Inventors: Mizuo Soeda, Tokyo; Yoichi Yuza, Ichihara; Takeo Ito; Kazue Watanabe, both of Chiba-ken, all of (JP); Ted W. Bush, Carlisle; Martin Green, Andover, both of MA (US); John M. Branan, Jr., Amarillo, TX (US)

(73) Assignee: Cabot Corporation, Boston, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 07/975,587
(22) PCT Filed: Jul. 24, 1991
(86) PCT No.: PCT/US91/05229
  § 371 Date: Mar. 21, 1994
  § 102(e) Date: Mar. 21, 1994
(87) PCT Pub. No.: WO92/01628
  PCT Pub. Date: Feb. 6, 1992

(30) Foreign Application Priority Data

Jul. 25, 1990 (JP) .................................................. 2-196953

(51) Int. Cl.⁷ ...................................................... C09C 1/50
(52) U.S. Cl. ...................... 524/495; 423/449.1; 524/496; 152/905
(58) Field of Search ........................ 423/449.1; 524/495, 524/496; 152/905

(56) References Cited

U.S. PATENT DOCUMENTS

| | | | |
|---|---|---|---|
| 4,246,251 | 1/1981 | Braddock | 423/450 |
| 4,478,973 | 10/1984 | Misono et al. | 524/496 |
| 4,703,079 | 10/1987 | Ahmad et al. | 524/495 |
| 5,093,407 | 3/1992 | Komai et al. | 524/495 |
| 5,124,396 | * 6/1992 | Branan, Jr. et al | 423/449.1 |
| 5,137,962 | 8/1992 | Green | 524/496 |
| 5,168,106 | 12/1992 | Babcock et al. | 524/495 |

FOREIGN PATENT DOCUMENTS

| | | | |
|---|---|---|---|
| 0102072 | 3/1984 | (EP) | C09C/1/50 |
| 0102072 | * 3/1989 | (EP) . | |
| 2540130 | 8/1984 | (FR) | C08L/21/00 |
| 2651787 | 3/1991 | (FR) | C09C/1/48 |
| 2651788 | 3/1991 | (FR) | C09C/1/48 |
| 9112202 | 8/1991 | (WO) | C01B/31/02 |

OTHER PUBLICATIONS

Supplementary European Search Report, Feb. 12, 1993.

* cited by examiner

Primary Examiner—Stuart Hendrickson

(57) ABSTRACT

New carbon blacks that when incorporated into rubber compositions impart increased abrasion resistance and lower hysteresis. Also disclosed are rubber composition incorporating the novel carbon blacks, which have nitrogen surface area of at least 100, a CDBP of at least 105, a tint of 90–140 and a delta D50/Dmode ratio of 0.6–0.76.

10 Claims, 2 Drawing Sheets

CARBON BLACK AND RUBBER COMPOSITION CONTAINING SAME

FIELD OF THE INVENTION

The present invention relates to a class of new and novel furnace carbon blacks which are suitable for various applications and particularly well suited for use in rubber compositions. The carbon blacks of the present invention impart improved hysteresis loss and abrasion resistance to rubber compositions, particularly passenger car tires, in which they are incorporated.

BACKGROUND

Carbon blacks are generally produced in a furnace-type reactor by pyrolyzing a hydrocarbon feedstock with hot combustion gases to produce combustion products containing particulate carbon black.

Carbon blacks may be utilized as pigments, fillers, reinforcing agents and for a variety of other applications. For example, carbon blacks are widely utilized as fillers and reinforcing pigments in the compounding and preparation of rubber compositions.

Carbon blacks for rubber use have a variety of grades depending upon their properties and are generally classified on the basis of analytical properties including: surface area, structure (DBP absorption) and the like. Methods of measuring the surface area of carbon black include an electron microscope, nitrogen surface area ($N_2SA$) according to the BET method, CTAB surface area according to the adsorption of cetyltrimethylammonium bromide as a surfactant, and iodine adsorption number ($I_2$ No.). The structure of a carbon black refers to the linkage of carbon black particles due to agglomeration. As the degree of agglomeration becomes greater, the value of this structure becomes higher.

The properties of the grade of carbon black become an important factor in determining various performances of the rubber composition wherein the carbon blacks are incorporated. Carbon blacks are effective in the preparation of rubber vulcanizates intended for usage in preparing tires. It is generally desirable in the production of tires to utilize carbon blacks which impart high levels of abrasion resistance and low levels of rolling resistance to the tires. The reinforcing properties of a carbon black are generally related to the level of abrasion resistance imparted to the rubber compositions. Generally, carbon blacks with increased reinforcing properties result in tires with increased abrasion resistance.

The grade of the carbon black used mainly for tire treads is classified into HAF (high abrasion furnace), ISAF (intermediate super abrasion furnace) and SAF (super abrasion furnace) with SAF carbon black having a higher surface area than ISAF carbon black which has a higher surface area than HAF carbon black. Abrasion resistance generally improves as surface area increases.

The properties of the grade of carbon black become an important factor in determining various performances of the rubber composition wherein the carbon blacks are incorporated. Generally, carbon blacks having a specific surface area higher than ISAF are used for tire treads of trucks and buses wherein natural rubber is used as a main component. HAF type carbon blacks are generally used for passenger car tire treads wherein synthetic rubbers such as styrene butadiene rubber (SBR) are used as a main component.

Higher surface area carbon blacks impart improved abrasion resistance to tires. However, as specific surface area becomes larger, heat build-up of the rubber compound becomes higher and hysteresis becomes greater. The hysteresis of the compounds means the difference between the energy applied to deform a rubber compound, and the energy released as the rubber compound recovers to its initial undeformed state. Tires with lower hysteresis values have reduced rolling resistance and therefore reduce the fuel consumption of the vehicle utilizing the tire.

Thus it would be desirable to develop a carbon black which would impart both improved abrasion resistance and reduced hysteresis to rubber compounds. Tires prepared with such a carbon black would have lower rolling resistance, to improve the fuel economy of the vehicle utilizing the tire, and improved abrasion resistance, to reduce the tread wear of the tire.

One advantage of the present invention is the production of new carbon blacks which impart increased abrasion resistance and reduced hysteresis properties to natural rubbers, synthetic rubbers and blends of natural and synthetic rubbers incorporating the carbon blacks.

Another object of the present invention is new rubber compositions, advantageous for use as tires, particularly passenger car tires, incorporating the new carbon blacks.

Other objects of the present invention will become apparent from the following description and the claims.

SUMMARY OF THE INVENTION

We have discovered a new class of carbon blacks having a nitrogen surface area ($N_2SA$) of at least 100 $m^2/g$ (square meters per gram); a CDBP (dibutyl phthlate absorption number of the crushed carbon black) of at least 105 cc/100 g (cubic centimeters per 100 g); a TINT (Tint value) of from about 90 to about 140, a Dmode (mode diameter of the carbon black aggregate according to the centrifugal sedimentation method) of the following relationship with the TINT: Dmode (nm)$\geq$218−1.12(TINT), (nm=nanometers= meters$\times 10^{-9}$), preferably Dmode (nm)$\geq$221−1.12 (TINT) ; and a $\Delta$D50/Dmode ratio (ratio of the half width value to the mode diameter, of the carbon black aggregate, according to the centrifugal sedimentation method) of from about 0.6 to about 0.8. We have also discovered a new class of rubber compositions containing these carbon blacks.

Referring to the blacks of the present invention, when the $N_2SA$ is more than 100 $m^2/g$ the carbon black is restricted to the ISAF and SAF classes.

When CDBP is less than 105 cc/100 g the balance between the reinforcing properties and hyteresis imparted by the carbon black to rubber compositions, particularly advantageous for use as passenger car tires, is generally unsatisfactory.

When TINT is less than 90, the reinforcing properties imparted by the carbon black to rubber compositions, particularly advantageous for use as passenger car tires, is generally unsatisfactory. When TINT exceeds 140 the carbon blacks disperse poorly during mixing in the formation of rubber compositions particularly advantageous for use as passenger car tires.

When Dmode is less than the calculated value from TINT, the improvement in hysteresis effect, imparted by the carbon blacks to rubber compositions, particularly advantageous for use as passenger car tires, becomes disadvantageously reduced.

When the $\Delta$D50/Dmode ratio is greater than 0.8 the reinforcing properties imparted by the carbon black to rubber compositions, particularly advantageous for use as passenger car tires, is disadvantageously reduced. While Applicants do not wish to be bound by any particular theory, it is believed that this reduction occurs because of wider aggregate size distribution. When the ΔD50/Dmode ratio is less than 0.6 the hyteresis loss value of rubber compositions incorporating the carbon black, particularly advantageous for use as passenger car tires, disadvantageously becomes large.

However, we have discovered that the carbon blacks of the present invention, having analytical properties within the ranges specified, impart improved reinforcing properties and low hysteresis loss to rubber compositions, prepared utilizing natural rubbers, synthetic rubbers or mixtures thereof. As explained above, the improved reinforcing properties of the carbon blacks impart improved abrasion resistance to rubber compositions.

The carbon black of the present invention may be produced in a furnace carbon black reactor having a first (combustion) zone, a transition zone, and a stepped reaction zone wherein the diameter of the portion of the reaction zone nearest the transition zone is smaller than the diameter of a portion of the reaction zone further downstream of the transition zone. A carbon black yielding feedstock is injected in any manner known to the art, into a hot combustion gas stream. The resultant mixture of hot combustion gases and feedstock passes into the reaction zone. Pyrolysis, of the carbon black yielding feedstock, is stopped by quenching the mixture when the carbon blacks of the present invention have been formed. Preferably pyrolysis is stopped by a quench injecting a quenching fluid. A reactor suitable for use in producing the carbon blacks of the present invention is described generally in U.S. Pat. No. 3,922,335, the disclosure of which is hereby incorporated by reference. The process for preparing the novel carbon blacks of the present invention will be described in greater detail hereinafter.

The rubbers for which the novel carbon blacks of this invention are effective as reinforcing agents include natural and synthetic rubbers. Generally, amounts of the carbon black product ranging from about 10 to about 250 parts by weight can be used for each 100 parts by weight of rubber in order to impart a significant degree of reinforcement. It is, however, preferred to use amounts varying from about 20 to about 200 parts by weight of carbon black per 100 parts by weight of rubber and especially preferred is the utilization of from about 30 to about 100 parts of carbon black per 100 parts of rubber.

Among the rubbers suitable for use with the present invention are natural rubber and its derivatives such as chlorinated rubber; copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, alkyl-substituted acrylates, vinyl ketone, methyl isopropenyl ketone, methyl vinyl ether, alphamethylene carboxylic acids and the esters and amides thereof such as acrylic acid and dialkylacrylic acid amide; also suitable for use herein are copolymers of ethylene and other high alpha olefins such as propylene, butene-1 and penetene-1; particularly preferred are the ethylene-propylene copolymers wherein the ethylene content ranges from 20 to 90 percent by weight and also the ethylene-propylene polymers which additionally contain a third monomer such as dicyclopentadiene, 1,4-hexadiene and methylene norbornene.

An advantage of the carbon blacks of the present invention is that the carbon blacks impart increased abrasion resistance and lower hysteresis to compositions containing natural rubbers, synthetic rubbers or blends thereof in which the carbon blacks of the present invention are incorporated.

An advantage of the rubber compositions of the present invention is the that the rubber compositions are particularly well suited for use as passenger car tires.

Other advantages of the present invention will become apparent from the following more detailed description of the invention.

DETAILED DESCRIPTION OF THE INVENTION

The carbon blacks of the present invention are characterized by having a $N_2SA$ of at least 100 $m^2/g$ ($N_2SA \geq 100$ $m^2/g$); a CDBP of at least 105 cc/100 g (CDBP$\geq$105 cc/100 g); a TINT of from about 90 to about 140, a Dmode(nm) $\geq 218-1.12$(TINT), (Dmode(nm) of at least 218 minus (1.12 times TINT)), preferably Dmode(nm)$\geq$221$-$1.12(TINT); and a ΔD50/Dmode ratio of from about 0.6 to about 0.8. We have also discovered a new class of rubber compositions containing these carbon blacks.

The carbon black of the present invention may be produced in a modular, also referred to as "staged", furnace carbon black reactor. A section of a typical modular furnace carbon black reactor which may be utilized to produce the carbon black of the present invention is depicted in FIG. 1.

Figure 1:
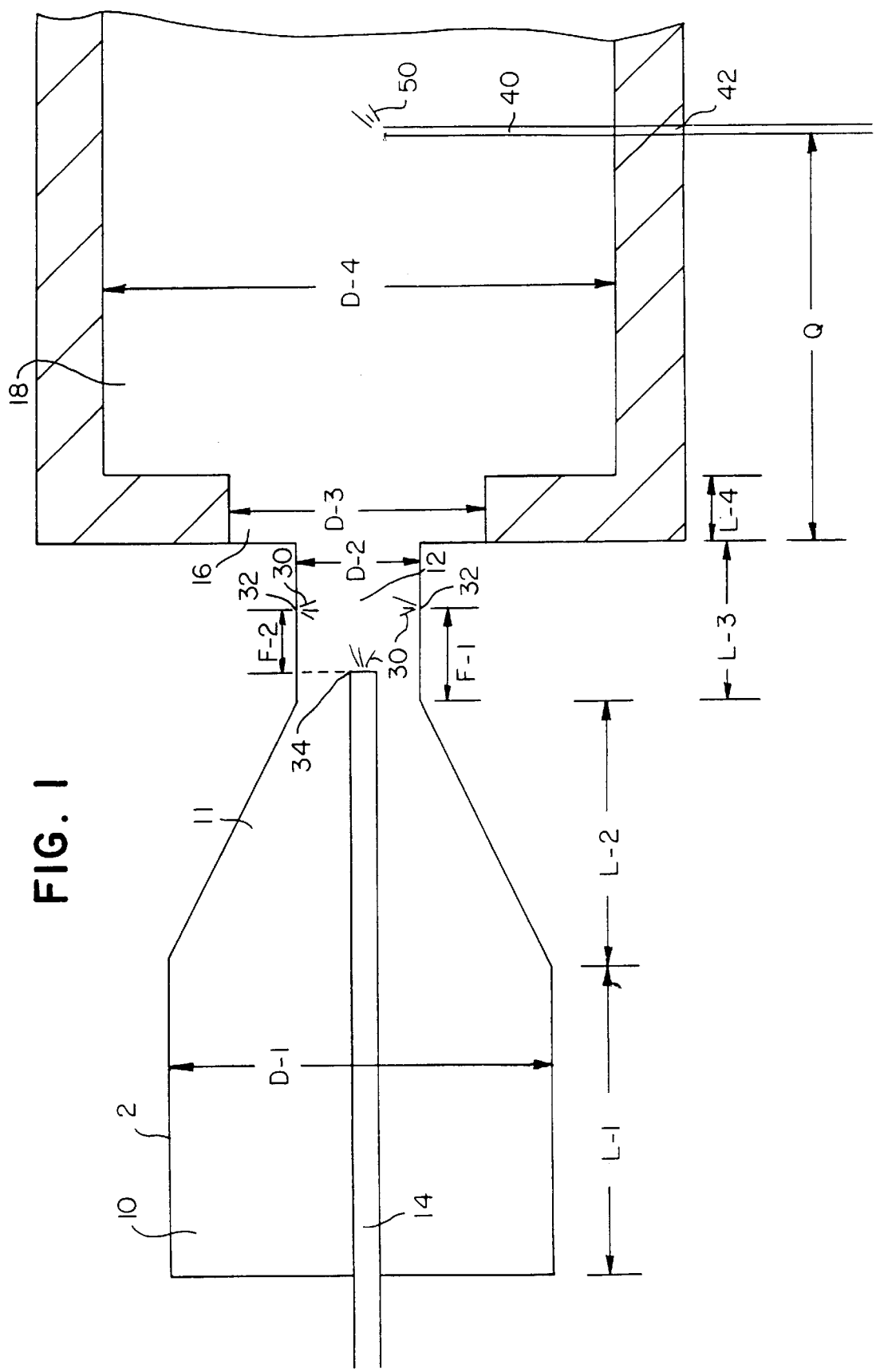
FIG. 1 is a cross-sectional view of a portion of one type of furnace carbon black reactor which may be utilized to produce the carbon blacks of the present invention.

Referring to FIG. 1, the carbon black of the present invention may be produced in a furnace carbon black reactor 2, having a combustion zone 10, which has a zone of converging diameter 11, transition zone 12, and reaction zone 18, which has a zone of restricted diameter 16. The diameter of the combustion zone 10, up to the point where the zone of converging diameter 11, begins is shown as D-1; the diameter of zone 12, as D-2; the diameter of zone 16, as D-3; and the diameter of zone 18, as D-4. The length of the combustion zone 10, up to the point where the zone of converging diameter 11, begins is shown as L-1; the length of the zone of converging diameter is shown as L-2; the length of the transition zone is shown as L-3; and the length of zone 16, is shown as L-4.

To produce the carbon black of the present invention hot combustion gases are generated in combustion zone 10, by contacting a liquid or gaseous fuel with a suitable oxidant stream such as air, oxygen, mixtures of air and oxygen or the like. Among the fuels suitable for use in contacting the oxidant stream in combustion zone 10, to generate the hot combustion gases are included any of the readily combustible gas, vapor or liquid streams such as natural gas, hydrogen, carbon monoxide, methane, acetylene, alcohols, or kerosene. It is generally preferred, however, to utilize fuels having a high content of carbon-containing components and in particular, hydrocarbons. The ratio of air to natural gas utilized to produce the carbon blacks of the present invention may be from about 10:1 to about 30:1. To facilitate the generation of hot combustion gases, the oxidant stream may be preheated, for example to a temperature between 500° C. and 900° C. Potassium carbonate ($K_2CO_3$) may also be introduced into the combustion gas stream, generally, if added, at a rate between 0.017 grams per liter of feedstock and 0.15 grams per liter of feedstock.

The hot combustion gas stream flows downstream from zones 10 and 11 into zones 12, 16 and then 18. The direction of the flow of hot combustion gases is shown in the figure by the arrow. Carbon black-yielding feedstock 30, is introduced at point 32 (located in zone 12). Carbon black-yielding feedstock 30, is simultaneously introduced upstream through probe 14, at point 34.

The distance from the end of the zone of converging diameter 11, to point 32, is shown as F-1 and the distance from point 32 to upstream point 34 is shown as F-2. To produce the carbon black of the present invention, the feedstock may be injected in an amount of from about 40% to about 85%, by weight, at point 32, and the remainder of the total amount of from about 15% to about 60%, by weight, injected at point 34. In the examples described herein carbon black-yielding feedstock 30, was injected in the form of a plurality of jets which penetrate into the interior regions of the hot combustion gas stream to insure a high rate of mixing and shearing of the hot combustion gases and the carbon black-yielding feedstock so as to rapidly and completely decompose and convert the feedstock to the novel carbon black of the present invention.

The mixture of carbon black-yielding feedstock and hot combustion gases flows downstream through zone 12 into zones 16 and 18. Quench 40, located at point 42, injecting quenching fluid 50, which in the examples is water, is utilized to stop pyrolysis of the carbon black-yielding feedstock when the novel carbon blacks of the present invention are formed. Point 42 may be determined in any manner known to the art, for selecting the position of a quench to stop pyrolysis. One method for determining the position of the quench to stop pyrolysis is by determining the point at which an acceptable toluene extract level for the novel carbon blacks of the present invention is achieved. Toluene extract level may be measured by using ASTM Test D1618-83 "Carbon Black Extractables-Toluene Discoloration". Q is the distance from the beginning of zone 16 to quench point 42, and will vary according to the position of the quench. Generally the temperature of the combustion stream at the quench is lowered to between 600° C. and 900° C.

After the mixture of hot combustion gases and carbon black-yielding feedstock is quenched, the cooled gases pass downstream into any conventional cooling and separating means whereby the carbon blacks are recovered. The separation of the carbon black from the gas stream is readily accomplished by conventional means such as a precipitator, cyclone separator or bag filter. This separation may be followed by pelletizing using, for example, a wet pelletizer.

The following testing procedures are used in the determination and evaluation of the analytical properties of the carbon blacks of the present invention, and the physical properties of the rubber compositions incorporating the carbon blacks of the present invention.

Nitrogen surface area of the carbon blacks ($N_2SA$) was determined according to ASTM D3037-88. Crushed DBP absorption number (CDBP) was determined according to ASTM D3493-88. TINT (tinting strength) was determined according to ASTM D3265-85a.

Figure 2:
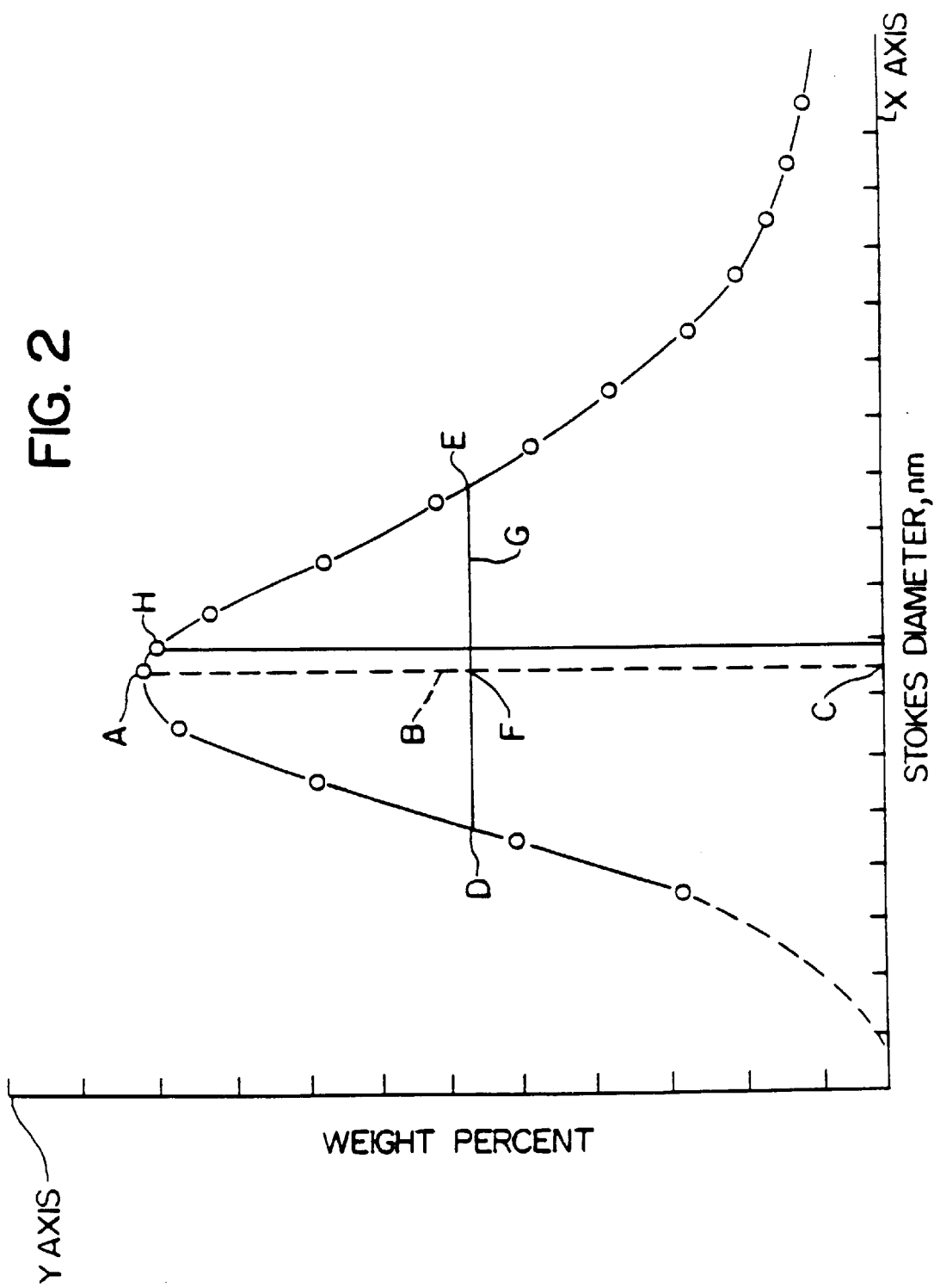
FIG. 2 is a graph with an example of a Stokes diameter distribution curve.

ΔD50 and Dmode of the carbon blacks were determined in the following manner. A histogram is made of the Stokes diameter of the aggregates of the carbon black sample versus the relative frequency of their occurrence in a given sample. As shown in FIG. 2, a line (B) is drawn from the peak (A) of the histogram in a direction parallel to the Y axis, to and ending at the X-axis at point (C) of the histogram. The midpoint (F) of the resultant line (B) is determined and a line (G) is drawn through the midpoint (F) thereof parallel to the X-axis. Line (G) intersects the distribution curve of the histogram at two points D and E. The absolute value of the difference of the two Stokes diameters of the carbon black particles at points D and E is the ΔD 50 value. The data used to generate the histogram are determined by the use of a disk centrifuge such as the one manufactured by Joyce Loebl Co. Ltd. of Tyne and Wear, United Kingdom. The following procedure is a modification of the procedure described in the instruction manual of the Joyce Loebl disk centrifuge file reference DCF 4.008 published on Feb. 1, 1985, the teachings of which are hereby incorporated by reference, and was used in determining the data.

The procedure is as follows. 10 mg (milligrams) of a carbon black sample are weighed in a weighing vessel, then added to 50 cc of a solution of 10% absolute ethanol and 90% distilled water which is made 0.05% NONIDET P-40 surfactant (NONIDET P-40 is a registered trademark for a surfactant manufactured and sold by Shell Chemical Co.). The resulting suspension is dispersed by means of ultrasonic energy for 15 minutes using Sonifier Model No. W 385, manufactured and sold by Heat Systems Ultrasonics Inc., Farmingdale, N.Y.

Prior to the disk centrifuge run the following data are entered into the computer which records the data from the disk centrifuge:
1. The specific gravity of carbon black, taken as 1.86 g/cc;
2. The volume of the solution of the carbon black dispersed in a solution of water and ethanol, which in this instance is 0.5 cc.;
3. The volume of spin fluid, which in this instance is 10 cc of water;
4. The viscosity of the spin fluid, which in this instance is taken as 0.933 centipoise at 23 degrees C.;
5. The density of the spin fluid, which in this instance is 0.9975 g/cc at 23 degrees C.;
6. The disk speed, which in this instance is 8000 rpm;
7. The data sampling interval, which in this instance is 1 second.

The disk centrifuge is operated at 8000 rpm while the stroboscope is operating. 10 cc of distilled water are injected into the spinning disk as the spin fluid. The turbidity level is set to 0; and 1 cc of the solution of 10% absolute ethanol and 90% distilled water is injected as a buffer liquid. The cut and boost buttons of the disk centrifuge are then operated to produce a smooth concentration gradient between the spin fluid and the buffer liquid and the gradient is monitored visually. When the gradient becomes smooth such that there is no distinguishable boundary between the two fluids, 0.5 cc of the dispersed carbon black in aqueous ethanol solution is injected into the spinning disk and data collection is started immediately. If streaming occurs the run is aborted. The disk is spun for 20 minutes following the injection of the dispersed carbon black in aqueous ethanol solution. Following the 20 minutes of spinning, the disk is stopped, the temperature of the spin fluid is measured, and the average of the temperature of the spin fluid measured at the beginning of the run and the temperature of the spin fluid measured at the end of the run is entered into the computer which records the data from the disk centrifuge. The data is analyzed according to the standard Stokes equation and is presented using the following definitions:

Carbon black aggregate—a discrete, rigid colloidal entity that is the smallest dispersible unit; it is composed of extensively coalesced particles;

Stokes diameter—the diameter of a sphere which sediments in a viscous medium in a centrifugal or gravitational field according to the Stokes equation. A non-spherical object, such as a carbon black aggregate, may also be represented in terms of the Stokes diameter if it is considered as behaving as a smooth, rigid sphere of the same density and rate of sedimentation as the non-spherical object. The customary units are expressed in nanometer diameters.

Mode (Dmode for reporting purposes)—The Stokes diameter at the point of the peak (Point A of FIG. 2 herein) of the distribution curve of Stokes diameter.

Median Stokes diameter—(Dst for reporting purposes) the point on the distribution curve of Stokes diameter where 50% by weight of the sample is either larger or smaller (Point H of FIG. 2 herein). It therefore represents the median value of the determination.

The abrasion data of the rubber compositions were determined using an abrader which is based on a Lambourn type machine. Abrasion rates (cubic centimeter/centimeter travel) were measured at 7%, 13% and 21% slip. The slip is based on the relative velocity of the plates rather than angle of slip. In the following examples, the abrasion index is the ratio of the abrasion rate of a control composition containing VULCAN 6 carbon black, a trademarked carbon black of Cabot Corporation, Watham, Mass., that is an N220 carbon black, divided by the abrasion rate of a composition produced using a specified carbon black of the present invention, at the same slip. The analytical properties of the N220 carbon blacks are set forth in ASTM D 1765-90.

The modulus, tensile and elongation of the rubber compositions were measured by the procedure set forth in ASTM D 412. The tensile value relates to the reinforcing properties of the carbon black. A large tensile value indicates high reinforcing properties.

Rebound data were determined on the natural and synthetic rubber compositions in accordance with ASTM D1054 (Goodyear/Healy Test Procedure).

Rebound data were determined on all road test formulation rubber compositions utilizing a ZWICK Rebound Resilience Tester, Model 5109, manufactured by Zwick of America, Inc., Post Office Box 997, East Windsor, Conn. 06088. Instructions for determining the rebound values accompany the instrument. The rebound value relates to the hyteresis loss property of the rubber composition. A high rebound value indicates low hysteresis loss.

The effectiveness and advantages of the present invention will be further illustrated by the following examples.

EXAMPLES 1–2

Two examples of the novel carbon blacks of the present invention were prepared in carbon black production runs, in reactors generally described herein, and as depicted in FIG. 1, utilizing the reactor conditions and geometry set forth in Table 2. The fuel utilized in the combustion reaction in each example was natural gas. The properties of the feedstock utilized in each example are shown in Table 1.

TABLE 1

| | Feedstock Oil | |
|---|---|---|
| | Ex. 1 | Ex. 2 |
| Hydrogen/Carbon Ratio | 0.98 | 1.00 |
| Hydrogen (wt. %) | 7.52 | 7.59 |
| Carbon (wt. %) | 91.6 | 90.15 |
| Sulfur (wt. %) | 0.4 | 1.3 |
| BMCI (Visc-Grav) | 134 | 131 |
| A.P.I. Gravity 15.5/15.6 C(60)F [ASTM D-287] | −1.3 | −1.9 |
| Specific Gravity 15.5/15.6 C(60)F [ASTM D-287] | 1.087 | 1.092 |
| Viscosity, centistokes (130° F.) [ASTM D-88] | 19.1 | 85.7 |
| Viscosity, centistokes (210° F.) [ASTM D-88] | 4.1 | 10.3 |

TABLE 2

| | EX. 1 | EX. 2 |
|---|---|---|
| D-1, in. | 20.5 | 20.5 |
| D-2, in. | 12.4 | 10.4 |
| D-3, in. | 18.0 | 18.0 |
| D-4, in. | 45 | 27 |
| L-1, in. | 27 | 27 |
| L-2, in. | 29 | 29 |
| L-3, in. | 12 | 12 |
| L-4, in. | 9 | 9 |
| F-1, in. | 6 | 6 |
| F-2, in. | 16 | 9 |
| Q, in. | 60 | 36 |
| Oil Inj. Pt. 32, Tips # × Size, in. | 12 × 0.064 | 9 × 0.055 |
| Oil Rate Pt. 32, gph | 670 | 442 |
| Oil Press. Pt. 32, psig | 205 | 195 |
| Oil Preheat Pt. 32, ° F. | 410 | 345 |
| Oil Inj. Pt. 34, Tips # × Size, in. | 6 × 0.064 | 3 × 0.055 |
| Oil Rate Pt. 34, gph | 260 | 146 |
| Oil Press. Pt. 34, psig | 195 | 195 |
| Oil Preheat Pt. 34, ° F. | 410 | 345 |
| Comb. Air, kscfh | 575 | 400 |
| Comb. Air Preheat, ° F. | 1200 | 1180 |
| Nat. Gas, kscfh | 29.6 | 28.1 |
| Air to Burn Ratio | 9.7 | 9.5 |
| Quench Press., psig | 200 | 160 |
| Quench Temp., ° F. | 1440 | 1525 |

Inj. = Injection;
Comb. = combustion;
Press. = pressure;
Pt. 32 = Point 32 on Figure 1;
Pt. 34 = Point 34 on Figure 1;
gph = gallons per hour;
psig = pounds per square inch,
kscfh = standard cubic feet per hour, in thousands;
ft = feet;
in = inch;
° F. = degrees Farenheit The carbon blacks produced were then analyzed according to the procedures described herein. The analytical properties of the carbon blacks from Examples 1 and 2 were as shown in Table 3:

TABLE 3

| | Carbon Blacks | |
| --- | --- | --- |
| | Ex 1 | Ex 2 |
| $N_2SA$ (m$^2$/g) | 115 | 127 |
| CDBP (cc/100 g) | 109 | 107 |
| TINT (%) | 120 | 122 |
| Dmode (nm) | 88 | 82 |
| Δ D50 (nm) | 70 | 62 |
| Δ D50/Dmode | 0.80 | 0.76 |
| 218-1.12*TINT | 83.6 | 81.4 |

EXAMPLE 3

This Example illustrates the use of the novel carbon blacks of the present invention in a natural rubber composition.

Natural rubber compositions incorporating the novel carbon black of the present invention prepared in Example 1 and IRB #6 (Industry Rubber Black number 6, a known control carbon black) were prepared according to the following recipe.

| NATURAL RUBBER FORMULATION (ASTM D-3192) | |
| --- | --- |
| Ingredient | Parts By Weight |
| Natural Rubber | 100 |
| Carbon Black | 50 |
| Zinc Oxide | 5 |
| Stearic Acid | 3 |
| Accelerator MBTS | 0.6 |
| Sulfur | 2.5 |

Each of the natural rubber compositions was cured at 145° C. for 30 minutes.

Natural rubber composition A was prepared with the carbon black of Example 1. Natural rubber composition B was prepared with IRB #6 carbon black.

The static properties of the natural rubber compositions were then evaluated according to the ASTM procedures described herein. The results were as shown in Table 4:

TABLE 4

| Natural Rubber Composition | Modulus 300 % El* psi | Tensile Strength psi | $El_b$* % | Rebound % |
| --- | --- | --- | --- | --- |
| A (Ex. 1) | 2498 | 4051 | 489 | 57.7 |
| B (IRB #6) | 1759 | 3763 | 573 | 65.0 |

*El = elongation;
*$El_b$ = elongation at break.

EXAMPLE 4

This Example illustrates the use of the novel carbon blacks of the present invention in synthetic rubber compositions. Synthetic rubber compositions incorporating the novel carbon black of the present invention prepared in Example 1 and IRB #6 were prepared according to the following ASTM D3191 recipe:

| SYNTHETIC RUBBER (ASTM D3191) | |
| --- | --- |
| Ingredient | Parts By Weight |
| SBR-1500 rubber | 100 |
| Carbon Black | 50.00 |
| Zinc Oxide | 3.00 |
| Stearic Acid | 1.00 |
| Sulfur | 1.75 |
| TBBS | 1.00 |

SBR = styrene butadiene rubber
TBBS = N-tert-butyl-2-benzothiazole sulfenamide

Each of the synthetic rubber compositions was cured at 145° C. for 30 minutes.

Synthetic rubber composition C was prepared with the carbon black of Example 1. Synthetic rubber composition D was prepared with the reference IRB #6 carbon black.

The static properties of the synthetic rubber compositions were then evaluated according to the ASTM procedures described herein. The results were as shown in Table 5:

TABLE 5

| Synthetic Rubber Composition | Modulus 300 % El* psi | Tensile Strength psi | $El_b$* % | Rebound % |
| --- | --- | --- | --- | --- |
| C (Ex. 1) | 2789 | 3955 | 415 | 49.3 |
| D (IRB #6) | 1856 | 3464 | 552 | 54.9 |

*El = elongation;
*$El_b$ = elongation at break.

EXAMPLE 5

This Example also illustrates the use of the novel carbon blacks of the present invention in a natural rubber composition.

Natural rubber compositions incorporating the novel carbon black of the present invention prepared in Example 2 and IRB #6 were prepared according to the following recipe.

| NATURAL RUBBER FORMULATION (ASTM D-3192) | |
| --- | --- |
| Ingredient | Parts By Weight |
| Natural Rubber | 100 |
| Carbon Black | 50 |
| Zinc Oxide | 5 |
| Stearic Acid | 3 |
| Accelerator MBTS | 0.6 |
| Sulfur | 2.5 |

MBTS = mercaptobenzothiazolesulfenamide

Each of the natural rubber compositions was cured at 145° C. for 30 minutes.

Natural rubber composition E was prepared with the carbon black of Example 2. Natural rubber composition F was prepared with IRB #6 carbon black.

The static properties of the natural rubber compositions were then evaluated according to the ASTM procedures described herein. The results were as shown in Table 6:

TABLE 6

| Natural Rubber Composition | Modulus 300 % El* psi | Tensile Strength psi | El$_b$* % | Rebound % |
|---|---|---|---|---|
| E (Ex. 2) | 2281 | 4037 | 505 | 58.7 |
| F (IRB #6) | 1639 | 3621 | 573 | 64.7 |

*El = elongation;
*El$_b$ = elongation at break.

EXAMPLE 6

This Example also illustrates the use of the novel carbon blacks of the present invention in synthetic rubber compositions. Synthetic rubber compositions incorporating the novel carbon black of the present invention prepared in Example 2 and IRB #6 were prepared according to the following ASTM D3191 recipe:

SYNTHETIC RUBBER (ASTM D3191)

| Ingredient | Parts By Weight |
|---|---|
| SBR-1500 rubber | 100 |
| Carbon Black | 50.00 |
| Zinc Oxide | 3.00 |
| Stearic Acid | 1.00 |
| Sulfur | 1.75 |
| TBBS | 1.00 |

SBR = styrene butadiene rubber
TBBS = N-tert-butyl-2-benzothiazole sulfenamide

Each of the synthetic rubber compositions was cured at 145° C. for 30 minutes.

Synthetic rubber composition G was prepared with the carbon black of Example 2. Synthetic rubber composition H was prepared with the reference IRB #6 carbon black.

The static properties of the synthetic rubber compositions were then evaluated according to the ASTM procedures described herein. The results were as shown below in Table 7:

TABLE 7

| Synthetic Rubber Composition | Modulus 300 % El* psi | Tensile Strength psi | El$_b$* % | Rebound % |
|---|---|---|---|---|
| G (Ex. 2) | 2701 | 4407 | 435 | 49.7 |
| H (IRB #6) | 1686 | 3660 | 598 | 54.9 |

*El = elongation;
*El$_b$ = elongation at break.

EXAMPLE 7

This Example illustrates the use of the novel carbon black of example 1 in a road test formulation rubber composition, similar to the rubber composition utilized in radial passenger car tires, in comparison with rubber compositions produced using VULCAN 6 carbon black, an N220 carbon black; VULCAN K carbon black, an N351 carbon black; and VULCAN 10H carbon black, an N134 carbon black. The analytical properties of the N220, N351 and N134 carbon blacks are set forth in ASTM D 1765-90. VULCAN is a trademark for carbon blacks manufactured and sold by Cabot Corporation, Waltham, Mass. Rubber composition I was made with the carbon black of the present invention produced in Example 1. Rubber composition J was made with VULCAN 6 carbon black. Rubber composition K was made with VULCAN K carbon black. Rubber composition L was made with VULCAN 10H carbon black. Rubber compositions I, J, K and L were prepared incorporating each of the carbon black samples according to the rubber formulation procedure shown below in Table 8.

TABLE 8

Road Test Formulation Rubber Composition

| INGREDIENT | Part by weight |
|---|---|
| SBR 1712 | 89.38 |
| CIS-1,4 BR | 35.00 |
| Carbon Black | 65.00 |
| Oil (Sundex 790) | 10.62 |
| Zinc Oxide | 3.00 |
| Sunproof Improved Stabilizer | 2.50 |
| Wingstay 100 | 2.00 |
| Stearic Acid | 2.00 |
| N-cyclohexyl-2-benzothiazolesulfenamide | 1.50 |
| 2-mercaptobenzothiazole | 0.20 |
| Sulfur | 1.75 |

SBR 1712 = an oil extended styrene-butadiene copolymer having a content of 23.5% styrene and 76.5% butadiene.
CIS 1,4 BR = a polybutadiene rubber
Sundex 790 = ASTM D2226, Type 101 oil
Sunproof Improved Stabilizer = a stabilizer
Wingstay 100 = mixed diaryl p-phenylenediamine The Laboratory Abrasion Index and Rebound % of each rubber composition were evaluated as described herein. The results were as follows:

| Rubber Composition | 7% Slip | 13% Slip | 21% Slip | Rebound % |
|---|---|---|---|---|
| I (Ex. 1) | 105.2 | 120.1 | 138.8 | 38.8 |
| J (VULCAN 6) | 100 | 100 | 100 | 40.4 |
| K (VULCAN K) | 74.5 | 68.5 | 66.8 | 45.4 |
| L (VULCAN 10H) | 116.3 | 119.6 | 114.9 | 36.3 |

The laboratory abrasion index data show that rubber composition I, containing a carbon black of the present invention, exhibits higher abrasion resistance at the 13% and 21% slip values, than rubber compositions J, K and L incorporating the control carbon blacks.

EXAMPLE 8

This Example illustrates the use of the novel carbon black of example 2 in a road test formulation rubber composition, similar to the rubber composition utilized in radial passenger car tires, in comparison with rubber compositions produced using VULCAN 6 carbon black, an N220 carbon black; VULCAN K carbon black, an N351 carbon black; and VULCAN 10H carbon black, an N134 carbon black. The analytical properties of the N220, N351 and N134 carbon blacks are set forth in ASTM D 1765-90. VULCAN is a trademark for carbon blacks manufactured and sold by Cabot Corporation, Waltham, Massachusetts. Rubber composition M was made with the carbon black of the present invention produced in Example 2. Rubber composition N was made with VULCAN 6 carbon black. Rubber composition O was made with VULCAN K carbon black. Rubber composition P was made with VULCAN 10H carbon black. Rubber compositions M, N, O, and P were prepared incorporating each of the carbon black samples according to the rubber formulation procedure shown below in Table 9.

TABLE 9

Road Test Formulation Rubber Composition

| INGREDIENT | Part by weight |
|---|---|
| SBR 1712 | 89.38 |
| CIS-1,4 BR | 35.00 |
| Carbon Black | 65.00 |
| Oil (Sundex 790) | 10.62 |
| Zinc Oxide | 3.00 |
| Sunproof Improved Stabilizer | 2.50 |
| Wingstay 100 | 2.00 |
| Stearic Acid | 2.00 |
| N-cyclohexyl-2-benzothiazolesulfenamide | 1.50 |
| 2-mercaptobenzothiazole | 0.20 |
| Sulfur | 1.75 |

SBR 1712 = an oil extended styrene-butadiene copolymer having a content of 23.5% styrene and 76.5% butadiene.
CIS 1,4 BR = a polybutadiene rubber
Sundex 790 = ASTM D2226, Type 101 oil
Sunproof Improved Stabilizer = a stabilizer
Wingstay 100 = mixed diaryl p-phenylenediamine These results show that the static properties of the rubber composition M produced with the carbon black of the present invention are comparable to those of rubber compositions N, O, and P produced with reference carbon blacks.

The Laboratory Abrasion Index and Rebound % of each rubber composition were evaluated as described herein. The results were as follows:

| Rubber Composition | 7% Slip | 13% Slip | 21% Slip | Rebound % |
|---|---|---|---|---|
| M (Ex. 2) | 105.4 | 113.4 | 118.9 | 36.8 |
| N (VULCAN 6) | 100 | 100 | 100 | 39.5 |
| O (VULCAN K) | 70.4 | 59.2 | 56.2 | 43.4 |
| P (VULCAN 10H) | 112.4 | 115.0 | 112.1 | 35.9 |

The laboratory abrasion index data show that rubber composition M, containing a carbon black of the present invention, exhibits higher abrasion resistance at the 21% slip value, than rubber compositions J, K and L incorporating the control carbon blacks.

It should be clearly understood that the forms of the present invention herein described are illustrative only and are not intended to limit the scope of the invention. The present invention includes all modifications falling within the scope of the following claims.

What is claimed is:

1. A carbon black having a $N_2SA$ of at least 100 $m^2/g$, a CDBP of at least 105 cc/100 g, a TINT (Tint value) of from 90 to 140; a Dmode (nm)$\geq$218−1.12(TINT); and a $\Delta D50/$Dmode ratio of from 0.6 to 0.76.

2. The carbon black of claim 1 wherein Dmode (nm) $\geq$221−1.12(TINT).

3. The carbon black of claim 1, wherein the $N_2SA$ is 115 $m^2/g$; the CDBP is 109 cc/100 g; the TINT is 120; and the Dmode is 88 nm.

4. The carbon black of claim 1 wherein the $N_2SA$ is 127 $m^2/g$; the CDBP is 107 cc/100 g; the TINT is 122; the Dmode is 82 nm; and the $\Delta D50/$Dmode ratio is 0.76.

5. A rubber composition comprising about 100 parts, by weight, of a rubber and from about 10 to about 250 parts, by weight, of a carbon black having a $N_2SA$ of at least 100 $m^2/g$, a CDBP of at least 105 cc/100 g, a TINT (Tint value) of from 90 to 140; a Dmode (nm)$\geq$218−1.12(TINT); and a $\Delta D50/$Dmode ratio of from 0.6 to 0.76.

6. The rubber composition of claim 5 wherein Dmode (nm)$\geq$221−1.12(TINT).

7. The rubber composition of claim 5, wherein the $N_2SA$ of the carbon is 115 $m^2/g$; the CDBP of the carbon black is 109 cc/100 g; the TINT of the carbon black is 120; and the Dmode of the carbon black is 88 nm.

8. The rubber composition of claim 5 wherein the $N_2SA$ of the carbon black is 127 $m^2/g$; the CDBP of the carbon black is 107 cc/100 g; the TINT of the carbon black is 122; the Dmode of the carbon black is 82 nm; and the $\Delta D50/$Dmode ratio of the carbon black is 0.76.

9. A tire comprising the rubber composition of claim 5.

10. A rubber composition comprising about 100 parts, by weight, of a rubber and from about 10 to about 250 parts, by weight, of a carbon black having a $N_2SA$ of at least 100 $m^2/g$; a CDBP of at least 105 cc/100 g; a TINT (Tint value) of from about 90 to about 140; a Dmode (nm)$\geq$2.18−1.12 (TINT); and a $\Delta D50/$Dmode ratio of from about 0.6 to 0.76 wherein said rubber is natural rubber, polymers and copolymers of conjugated dienes, or copolymers of conjugated dienes with an ethylenic group-containing monomer copolymerizable therewith.

\* \* \* \* \*